(12) United States Patent
Griffin

(10) Patent No.: US 7,116,460 B2
(45) Date of Patent: Oct. 3, 2006

(54) MODULATION CONTROL

(75) Inventor: Robert Griffin, Towcester (AU)

(73) Assignee: Bookham Technology, plc, Abingdon (GB)

( * ) Notice: Subject to any disclaimer, the term of this patent is extended or adjusted under 35 U.S.C. 154(b) by 0 days.

(21) Appl. No.: 10/497,472

(22) PCT Filed: Nov. 29, 2002

(86) PCT No.: PCT/GB02/05395

§ 371 (c)(1),
(2), (4) Date: Jan. 3, 2005

(87) PCT Pub. No.: WO03/049333

PCT Pub. Date: Jun. 12, 2003

(65) Prior Publication Data

US 2005/0117191 A1    Jun. 2, 2005

(30) Foreign Application Priority Data

Nov. 30, 2001 (GB) ................................. 0128784.6

(51) Int. Cl.
*G02F 1/03* (2006.01)
(52) U.S. Cl. .................... 359/245; 359/238; 359/239
(58) Field of Classification Search ............... 359/245, 359/337, 279, 276; 250/225
See application file for complete search history.

(56) References Cited

U.S. PATENT DOCUMENTS

| 3,713,042 | A | * | 1/1973 | Kinsel | .......................... | 372/18 |
| 4,893,352 | A | | 1/1990 | Welford | ....................... | 398/198 |
| 6,014,248 | A | | 1/2000 | Kobayashi et al. | .... | 359/337.13 |
| 6,130,859 | A | * | 10/2000 | Sonnenschein et al. | ..... | 367/134 |
| 6,671,053 | B1 | * | 12/2003 | Euteneuer et al. | .......... | 356/450 |
| 2004/0016874 | A1 | * | 1/2004 | Rao et al. | .................... | 250/225 |

FOREIGN PATENT DOCUMENTS

| EP | 0 496 298 A2 | 7/1992 |
| EP | 0 547 394 B1 | 8/1997 |
| EP | 1 004 920 A2 | 6/2000 |

(Continued)

OTHER PUBLICATIONS

Cormack, I.G. et al.: "Practical measurement of femtosecond optical pulses using time-resolved optical gating", Optics Communications, North-Holland Publishing Co. Amsterdam, NL, vol. 194, No. 4-6, Jul. 15, 2001, pp. 415-424 XP004306783, ISSN: 0030-4018.

*Primary Examiner*—Timothy Thompson
*Assistant Examiner*—Jerry Fang
(74) *Attorney, Agent, or Firm*—Lahive & Cockfield, LLP; Anthony A. Laurentano, Esq.

(57) ABSTRACT

A modulator arrangement for modulating an optical signal using a quadrature phase shift key for use in an optical wavelength division multiplex (WDM) optical communications system comprising a laser (2) for producing an optical signal of a selected wavelength, which signal is split by a splitter (4), each part of said split signal being applied to a respective phase modulator (6, 8) each for which phase modulators is adapted to modulate the phase of the signal in dependence on a respective drive voltages. The phase of the output of at least one modulator (6) is shiftable at least in part by a phase shifter (10), the split signals being recombined by an optical recombiner (12) to form an optical phase shift key output, wherein the output power is monitored by a detector (20), the detector signal then being used to drive a feedback arrangement to control electrodes of the phase modulators (6, 8) and/or phase shifter (10).

6 Claims, 1 Drawing Sheet

FOREIGN PATENT DOCUMENTS

| | | |
|---|---|---|
| GB | 2 364 790 A | 2/2002 |
| GB | 2 370 473 A | 6/2002 |

* cited by examiner

MODULATION CONTROL

RELATED APPLICATIONS

This application is a 35 U.S.C. 371 national stage filing of International Application No. PCT/GB02/05395, filed 29 Nov. 2002, which claims priority to Great Britain Patent Application No. 0128784.6 filed on 30 Nov. 2001, in Great Britain. The contents of the aforementioned applications are hereby incorporated by reference.

BACKGROUND OF THE INVENTION

The invention relates to a method and apparatus for controlling a quadrature phase shift key encoder in a wavelength division multiplex (WDM) optical communications system.

In this specification the term "light" will be used in the sense that it is used generically in optical systems to mean not just visible light but also electromagnetic radiation having a wavelength between 800 nanometres (nm) and 3000 nm. Currently the principal optical communication wavelength bands are centred on 1300 nm, 1550 nm (C-Band) and 1590 nm (L-Band), with the latter bands receiving the majority of attention for commercial exploitation.

Exemplary WDM systems operating in the 1550 nm C-Band optical fibre communication band are located in the infrared spectrum with International Telecommunication Union (ITU) 200, 100 or 50 GHz channel spacing (the so called ITU Grid) spread between 191 THz and 197 THz.

With ongoing developments in optically amplified dense wavelength division multiplex (DWDM) optical links as the backbone of point-to-point information transmission and the simultaneous increase in bit rate applied to each wavelength and the simultaneous increase in the number of channels, the finite width of the erbium gain window of conventional erbium-doped optical amplifiers (EDFAs) could become a significant obstacle to further increases in capacity. Conventional EDFAs have a 35 nm gain bandwidth which corresponds to a spectral width of 4.4 THz. System demonstrations of several Tbit/s data rate are already a reality and the spectral efficiency, characterised by the value of bit/s/Hz transmitted, is becoming an important consideration. Currently, high-speed optical transmission mainly employs binary amplitude keying, using either non-return-to-zero (NRZ) or return-to-zero (RZ) signing formats, in which data is transmitted in the form of optical pulses having a single symbol level, each symbol corresponding to two bits.

In WDM several factors limit the minimum channel spacing for binary amplitude signalling, and in practice spectral efficiency is limited to ~0.3 bit/s/Hz. Although increasing the per-channel bit rate tends to reduce system equipment, there are several problems that need to be overcome for transmission at bit rates above 10 Gbit/s; these being:

- dispersion management of the optical fibre links, this becomes increasingly difficult with increased bit rate;
- Polarisation mode dispersion (PMD) in the optical fibre causes increased signal degradation;
- Realisation of electronic components for multiplexing, de-multiplexing and modulator driving becomes increasingly difficult.

One technique which has been proposed which allows an improvement of spectral efficiency is the use of quadrature phase shift keying (QPSK) [S. Yamazaki and K. Emura, (1990) "Feasibility study on QPSK optical heterodyne detection system", J. Lightwave Technol., vol. 8, pp. 1646–1653]. In optical QPSK the phase of light generated by a transmitter laser is modulated either using a single phase modulator (PM) driven by a four-level electrical signal to generate phase shifts of 0, $\pi/2$, $\pi$ or $3\pi/2$ representative of the four data states, or using two concatenated phase modulators which generate phase shifts of 0 or $\pi/2$ and $\pi$ or $3\pi/2$ respectively. A particular disadvantage of QPSK is that demodulation requires, at the demodulator, a local laser which is optically phase-locked to the transmitter laser. Typically this requires a carrier phase recovery system. For a WDM system a phase-locked laser will be required for each wavelength channel. It further requires adaptive polarisation control which, in conjunction with a phase recovery system, represents a very high degree of complexity. Furthermore, systems that require a coherent local laser are sensitive to cross-phase modulation (XPM) in the optical fibre induced by the optical Kerr non-linearity, which severely restricts the application to high capacity DWDM transmission.

It has also been proposed to use differential binary phase shift keying OBPSK) [M. Rohde et al (2000) "Robustness of DPSK direct detection transmission format in standard fibre WDM systems", Electron. Lett., vol. 36]. In DBPSK data is encoded in the form of phase transitions of 0 or $\pi$ in which the phase value depends upon the phase of the carrier during the preceding symbol interval A Mach-Zehnder interferometer with a delay in one arm equal to the symbol interval is used to demodulate the optical signal. Although DBPSK does not require a phase-locked laser at the receiver it does not provide any significant advantages compared to conventional amplitude NRZ signalling.

U.S. Pat. No. 6,271,950 discloses a differential phase shift keying optical transmission system, comprising a laser to generate an optical signal a delay encoder to provide a different delay for each of M input channels and an M channel phase modulator which phase modulates the optical carrier signal with each of the differently delayed M input signal channels to form a time division multiplexed (TDM) phase modulated optical signal.

SUMMARY OF THE INVENTION

The present invention seeks to provide an improved control method and apparatus for an encoder for use in an optical phase shift key modulator arrangement.

According to the invention there is provided a modulator arrangement for modulating an optical signal using a quadrature phase shift key for use in an optical wavelength division multiplex (WDM) optical communications system comprising a laser for producing an optical signal of a selected wavelength, which signal is split by a splitter, each part of said split signal being applied to a respective phase modulator, each of which phase modulators is adapted to modulate the phase of the signal in dependence on a respective drive voltage, the phase of the output of at least one modulator being shiftable at least in part by a phase shifter, the split signals being recombined by an optical recombiner to form an optical phase shift key output, wherein the output power is monitored by a detector, the detector signal then being used to drive a feedback arrangement to control electrodes of the phase modulators and/or phase shifter.

The arrangement according to the invention advantageously controls the operating point of the modulators and phase shifter of the quadrature PSK system by controlling the bias point of the modulator and the absolute phase. This is useful both in the set up phase and during live use of the system.

Preferably the detector comprises a two photon absorption detector Preferably, the feedback arrangement comprises an oscillator adapted to provide a pilot frequency for the feedback arrangement, Preferably the feedback arrangement comprises three control circuits, each driven at a different pilot frequency Preferably, the phase shift key is a differential quadrature phase shift key. Preferably, the arrangement comprises three two photon absorption detectors.

BRIEF DESCRIPTION OF THE DRAWINGS

An exemplary embodiment of the invention will now be described in greater detail with reference to the drawings in which.

DESCRIPTION OF ILLUSTRATED EMBODIMENT

Figure 1:
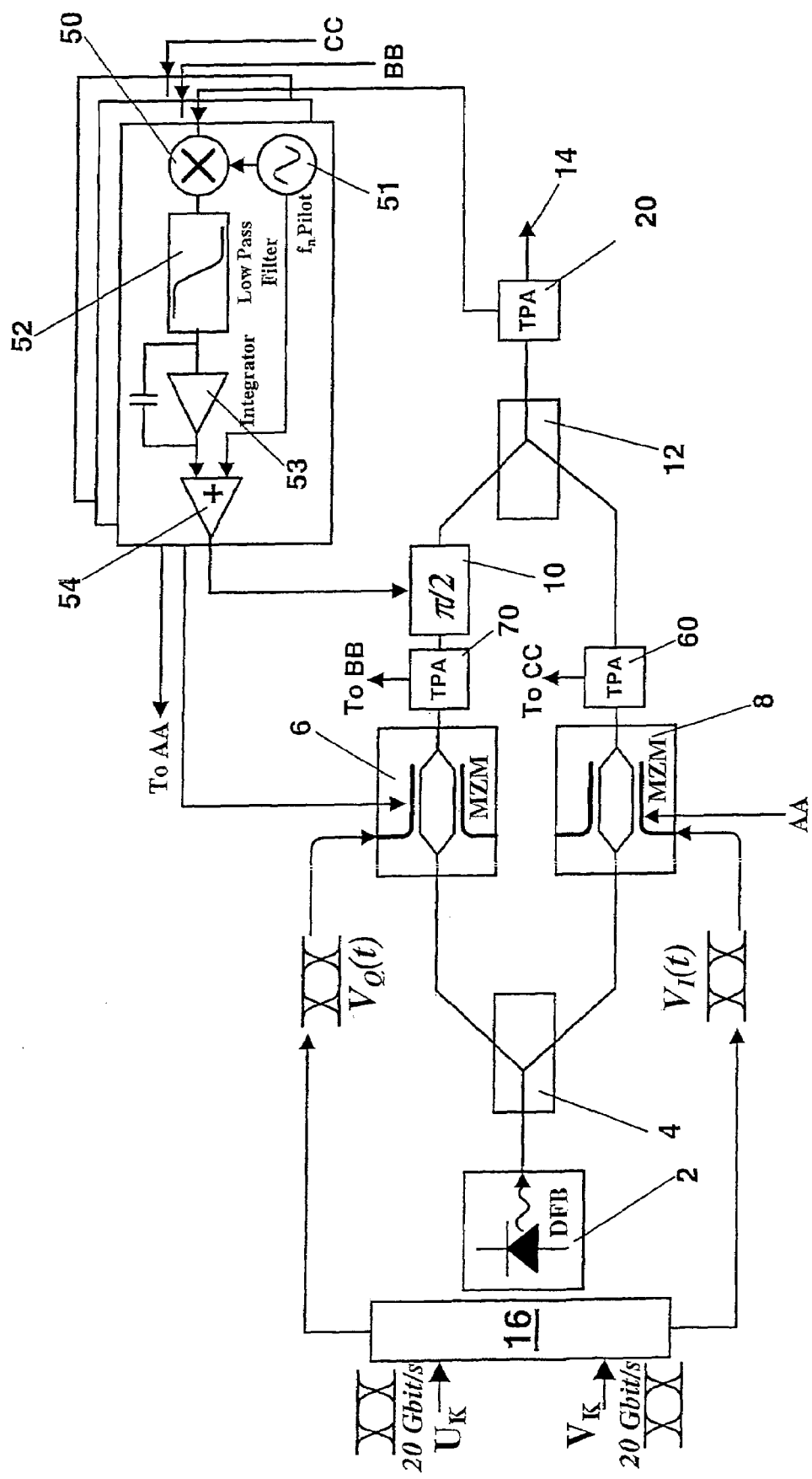
FIG. 1 shows an optical phase shift key modulator arrangement.

FIG. 1 shows an optical phase shift key modulator arrangement for encoding two 20 Gbit/s NRZ data streams $U_k$, $V_k$ onto a single optical carrier. Typically the modulator arrangement would be used as part of a transmitter in a WDM optical communications system with a respective modulator arrangement for each WDM wavelength channel.

The modulator arrangement comprises a single frequency laser 2, for example a distributed feedback (DFB) semiconductor laser due to its stable optical output for a given wavelength, which is operated to produce an unmodulated optical output of a selected wavelength, typically a WDM wavelength channel.

Light from the laser is transmitted to the integrated photonic device, where it is divided by an optical splitter 4 into two parts and each part is applied to a respective phase modulator 6, 8. Each phase modulator 6, 8 is configured such that it selectively modulates the phase by 0 or $\pi$ radians in dependence upon a respective binary (bipolar) NRZ drive voltage $V_I(t)$, $V_Q(t)$. In the preferred arrangement illustrated in FIG. 1 the phase modulators 6, 8 each comprise a Mach-Zehnder electro-optic modulator (MZM). As is known MZMs are widely used as optical intensity modulators and have an optical transmission versus drive voltage characteristic, which is cyclic and is generally raised cosine in nature. The half period of the MZM's characteristic, which is measured in terms of a drive voltage, is defined as $V_\pi$. Within the modulator arrangement of the present invention each MZM 6, 8 is required to operate as a phase modulator without substantially affecting the amplitude (intensity) of the optical signal. To achieve this each MZM 6, 8 is biased for minimum optical transmission in the absence of a drive, voltage and is driven with a respective drive voltage $V_I(t)$, $V_Q(t) = \pm V_\pi$ to give abrupt phase shifting with a minimum of amplitude modulation. The two phase modulators 6, 8 have matched delays (phase characteristics).

The optical output from the phase modulator 6 is passed through a phase shifter 10 which effectively applies a phase shift of $\pi/2$ such that the relative phase difference between the optical signals passing along the path containing the modulator 6 and that passing along the path containing the modulator 8 is $\pm\pi/2$. The optical signals from the phase shifter 10 and phase modulator 8 are recombined by an optical recombiner 12, to form an optical phase shift key (PSK) output 14. In the case of a GaAs modulator arrangement, the splitter 4 comprises a 1×2 MMI (multimode interference coupler) and recombiner 12 comprises a 2×2 MMI. The two MMIs co-operate to provide a phase shift to the signal of about $\pi/2$. A control electrode is then used to provide the fine control. There are of course alternative methods of obtaining a $\pi/2$ shift in one of the arms, such as using a control electrode to provide the entire shift.

To enable the power of the output signal to be monitored an output power detector 20 is provided at the combiner. The detector may comprise a fast linear photodiode or a two photon absorber (TPA) detector. If the modulator is implemented in lithium niobate, then a linear photodiode together with an RF power detector is preferred and conversely in a gallium arsenide based implementation a TPA detector is preferred as it facilitates the production of a monolithic device. A particular advantage of using a TPA detector is that only a small fraction of light is absorbed and gives directly RF power detection obviating the necessity for a separate splitter and photodetector, which would be used should the modulators be implemented using alternative materials such as lithium niobate. The TPA detector comprises an aluminium electrode forming a Schottky contact over the waveguide at the combiner. Two photon absorption is a non-resonant, non-linear optical process which occurs in semiconductor materials for photons having an energy less than the semiconductor band gap. The process occurs when an electron is excited from the valence band to an intermediate virtual state in the band gap by absorbing a first photon and is excited to the conduction band by absorbing a second photon This generates a photocurrent which is related to the optical power in the waveguide. At the optical output from the phase modulators 6, 8 are two two photon detectors (TPA) 60, 70. The output of each TPA 60, 70 is fed to a separate control circuit 50, 51, 52, 53, 54. Although it would be possible to rely solely on the power detector 20 (TPA) for all three control circuits, a more precise control will be obtained by the use of three detectors as better discrimination of the individual pilot tones can be obtained since some information on the optical power may be lost when the signals are combined.

The output of the detector is then fed to the control circuit. A separate control circuit is provided for each phase modulator 6, 8 and the phase shifter 10. Each control circuit comprises a synchronous detector and is functionally identical but operates at a different frequency. The use of the control circuit permits the optical phase to be controlled to within +−2° ($\pi/90$ radians).

In an analogue implementation, it is envisaged that three separate circuits, each operating at different frequency will be used. However, it would be possible to use a single digital circuit, which was switchable between the different frequencies.

In an implementation of the synchronous detector, the output of the detector is fed to a multiplier 50, which is driven at a pilot frequency provided by a local oscillator 51. The output of the multiplier 50 is then passed to an integrator 53 via a low pass filter 52. The low pass filter should have a cut off frequency lower than the difference in frequency between the adjacent local oscillators 51. The output of the integrator is then fed to a summing amplifier 54 together with the local oscillator 51. The respective output of the summing amplifier 54 is then fed back to the modulators 6, 8 and phase shifter 10, respectively.

The local oscillator 51 provides a pilot tone at a relatively low frequency well below the data bandwidth frequency. In a 20 GHz system, suitable frequencies for the three respective pilot tones would be of the order of 1 kHz, 2 kHz and 3 kHz. The dc output of the low pass filter acts to provide feedback to maintain the desired operating point of the control loop. In an ideal system, the dc component would be zero.

The bias of the individual MZMs 6, 8 acts to adjust itself to obtain the minimum dc output from the respective low pass filter 52 of their control circuit. Similarly the $\pi/2$ phase shifter acts to adjust itself to obtain a minimum dc output from the low pass filter of its respective control circuit.

The phase modulator drive voltages $V_I(t)$, $V_Q(t)$ are generated by pre-coding circuitry 16 in dependence upon the two binary data streams $U_k$, $V_k$. According to the modulator arrangement of the present invention the two data streams $U_k$, $V_k$ are differentially encoded such that these data are encoded onto the optical signal 14 in the phase transitions (changes) rather than in the absolute phase value. As a result it will be appreciated that the optical signal 14 is differential quadrature phase shift key (DQPSK) encoded.

The DQPSK optical signal 14 is ideally given by $E_0 \exp(i\omega t + \theta + \theta_i)$, where $\omega$ is the mean optical angular frequency, t is time, $\theta$ the carrier phase and $\theta_i$ a data dependent phase modulation for the i-th data symbol $d_i$. In the general case $d_i \in \{0, 1, \ldots M-1\}$ and for quarternary phase shift keying M=4, that is the data symbol has four values. The phase modulation term is given by $\theta_i = \theta_{i-1} + \Delta\theta_i(d_i)$ in which $\theta_{i-1}$ is the phase term for the previous data symbol $d_{i-1}$ and $\Delta\theta_i$ the change in phase between the $i_{-1}$ and i-th data symbols. The relationship between data symbol $d_i$ and phase shift $\Delta\theta_i$ for QPSK is tabulated below.

TABLE 1

Values of data $U_k$, $V_k$, data symbol $d_i$ and phase change $\Delta\theta_i$ ($d_i$) for DQPSK.

| $U_k$ | $V_k$ | $d_i$ | $\Delta\theta_i$ ($d_i$) |
|---|---|---|---|
| 0 | 0 | 0 | 0 |
| 0 | 1 | 1 | $\pi/2$ |
| 1 | 0 | 2 | $\pi$ |
| 1 | 1 | 3 | $3\pi/2$ |

It is to be noted that the mapping between data, data symbol and phase change is just one example and that other mappings can be used. The pre-coding circuitry 16 is configured such as to produce the appropriate drive voltages $V_I(t)$, $V_Q(t)$ in dependence upon the two data streams $d_1(t)$, $d_2(t)$ according to the relationships:

$$V_I(i) = V_I(i-1)\cos \Delta\theta(d_i) - V_Q(i-1)\sin \Delta\theta(d_i) \quad \text{Eq. 1}$$

$$V_Q(i) = V_I(i-1)\sin \Delta\theta(d_i) + V_Q(i-1)\cos \Delta\theta(d_i) \quad \text{Eq. 2.}$$

The invention claimed is:

1. A transmitter for modulating an optical signal using a quadrature phase shift key for use in an optical wavelength division multiplex (WDM) optical communications system, the transmitter comprising a laser for producing an optical signal of a selected wavelength, said signal is split by a splitter, each part of said split signal being applied to a respective phase modulator of the transmitter, each of said phase modulators is adapted to modulate a phase of the signal in dependence on a respective drive voltage, the phase of the output of at least one modulator being shiftable at least in part by a phase shifter of the transmitter, the split signals being recombined by an optical recombiner to form an optical phase shift key output, wherein the output power is monitored by a detector of the transmitter which generates a detector signal, the detector signal being adapted to drive a feedback arrangement of the transmitter to control electrodes of one of the phase modulator and the phase shifter of the transmitter.

2. The transmitter according to claim 1, wherein the detector comprises a two photon absorption detector.

3. The transmitter according to claim 1, wherein the feedback arrangement comprises an oscillator adapted to provide a pilot frequency, said pilot frequency drives a multiplier and a summing amplifier of said feedback arrangement.

4. The transmitter according to claim 1, wherein the feedback arrangement comprises first, second and third control circuits, each circuit being driven at a different pilot frequency, the first and second circuits controlling the phase modulators and the third circuit controlling the phase shifter.

5. The transmitter according to claim 2, wherein the detector further comprises three two photon detectors, one detector being located on an output of each of the modulators and one detector being located on an output of the recombiner.

6. The transmitter according to claim 1, wherein the quadrature phase shift key is a differential quadrature phase shift key.

* * * * *